US012763826B2

(12) United States Patent
Bui et al.

(10) Patent No.: US 12,763,826 B2
(45) Date of Patent: Oct. 13, 2026

(54) ADAPTIVE BEAMFORMING BASED ON DEVICE-TYPE

(71) Applicant: T-MOBILE INNOVATIONS LLC, Overland Park, KS (US)

(72) Inventors: Al Duy Bui, Seattle, WA (US); Timur Kochiev, Irvine, CA (US); Relin Thomas, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 324 days.

(21) Appl. No.: 18/396,246

(22) Filed: Dec. 26, 2023

(65) Prior Publication Data

US 2025/0211299 A1 Jun. 26, 2025

(51) Int. Cl.
*H04W 4/00* (2018.01)
*H04B 7/06* (2006.01)

(52) U.S. Cl.
CPC ......... *H04B 7/0617* (2013.01); *H04B 7/0626* (2013.01)

(58) Field of Classification Search
CPC ............................ H04B 7/0617; H04B 7/0626
See application file for complete search history.

(56) References Cited

U.S. PATENT DOCUMENTS

| | | | | |
|---|---|---|---|---|
| 10,715,193 | B2 * | 7/2020 | Zhu | H04B 17/26 |
| 2002/0054621 | A1 * | 5/2002 | Kyeong | H04B 7/0897 375/147 |
| 2009/0179797 | A1 * | 7/2009 | Kwon | H01Q 1/246 342/368 |
| 2015/0318908 | A1 * | 11/2015 | Ko | H04B 7/0421 375/267 |
| 2016/0050006 | A1 * | 2/2016 | Ko | H04W 72/20 370/329 |
| 2016/0211898 | A1 * | 7/2016 | Cai | H04B 7/0617 |
| 2018/0227094 | A1 * | 8/2018 | Liu | H04L 5/0025 |
| 2019/0306829 | A1 * | 10/2019 | Abedini | H04W 68/02 |
| 2020/0136717 | A1 * | 4/2020 | Li | H04B 7/0868 |
| 2021/0152993 | A1 * | 5/2021 | Fujimoto | H04W 16/28 |
| 2022/0116789 | A1 * | 4/2022 | Bertizzolo | H04B 7/0456 |
| 2022/0247474 | A1 * | 8/2022 | Rune | H04B 7/024 |
| 2023/0088577 | A1 * | 3/2023 | Raghavan | H04B 7/088 375/267 |

* cited by examiner

*Primary Examiner* — Elisabeth Benoit Magloire
(74) *Attorney, Agent, or Firm* — SHOOK, HARDY & BACON L.L.P.

(57) ABSTRACT

Systems and methods are provided for selecting and dynamically adjusting beamforming techniques offered to and applied to one or more devices based on a type of the device. Specifically, a device that is determined to be stationary can utilize a different beamforming technique than a device that is determined to be mobile (i.e., not stationary). Based on the determinations of whether a device is stationary or mobile, a specific beamforming technique can be offered to that device. Further, devices that are located in a same location in the service area (e.g., both devices are located at cell edge, both are near cell, etc.) can utilize different beamforming techniques such that multiple beamforming techniques are employed in the same location.

18 Claims, 4 Drawing Sheets

ADAPTIVE BEAMFORMING BASED ON DEVICE-TYPE

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for adaptive beamforming. More particularly, in aspects set forth herein, systems and methods are provided for selecting and dynamically adjusting beamforming techniques offered to and applied to devices based on a type of the device. Specifically, a device that is determined to be stationary can utilize a different beamforming technique than a device that is determined to be mobile (i.e., not stationary). Based on the determinations of whether a device is stationary or mobile, a specific beamforming technique can be offered to that device. Further, devices that are located in a same location in the service area (e.g., both devices are located at cell edge, both are near cell, etc.) can utilize different beamforming techniques such that multiple beamforming techniques are employed in the same location.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
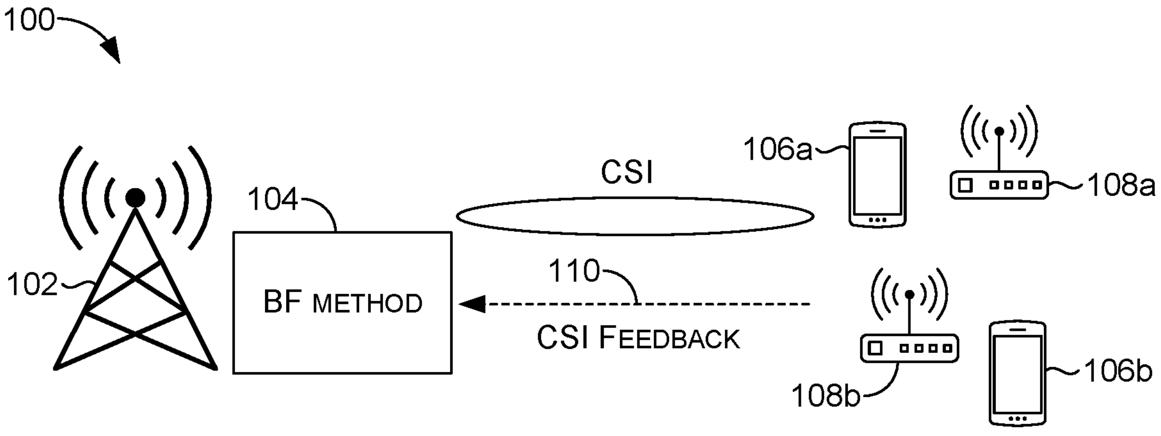
FIG. 1 PRIOR ART
FIG. 1 depicts a diagram of a network environment providing a singular beamforming technique.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AMF Access & Mobility Management Function
APN Access Point Name
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCF Policy Control Function
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SINR Signal-to-Interference-Plus-Noise Ratio
SMF Session Management Function
SNR Signal-to-Noise Ratio
SON Self-Organizing Networks
TDMA Time Division Multiple Access
TXRU Transceiver (or Transceiver Unit)
UDM Unified Data Management Function
UDR Unified Data Repository
UE User Equipment
UPF User Plane Function Further, various technical terms are used throughout this description. An illustrative resource that fleshes out various aspects of these terms can be found in Newton’s Telecom Dictionary, 32d Edition (2022).

As used herein, the term “node” is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

The present disclosure is directed to adaptive beamforming. Specifically, systems and methods for selecting and dynamically adjusting beamforming techniques offered to and applied to one or more devices based on a type of the device are described. In particular, a device that is determined to be stationary can utilize a different beamforming technique than a device that is determined to be mobile (i.e., not stationary). Based on the determinations of whether a device is stationary or mobile, a specific beamforming technique can be offered to that device. Further, devices that are located in a same location in the service area (e.g., both devices are located at cell edge, both are near cell, etc.) can utilize different beamforming techniques such that multiple beamforming techniques are employed in the same location.

Accordingly, a first aspect of the present disclosure is directed to a system for adaptive beamforming. The system comprises one or more processors and one or more computer-readable media storing computer-usable instructions that, when executed by the one or more processors, cause the one or more processors to: receive a device-type identifier for each of a first device and a second device, wherein a first device-type identifier for the first device is different from a second device-type identifier for the second device; based on the first device-type identifier, identify a first beamforming technique to utilize for the first device; and based on the second device-type identifier, identify a second beamforming technique to utilize for the second device, wherein the second beamforming technique is different from the first beamforming technique.

A second aspect of the present disclosure is directed to a method for adaptive beamforming. The method comprises receiving a device-type identifier for each of a first device and a second device, wherein a first device-type identifier for the first device is different from a second device-type identifier for the second device; based on the first device-type identifier, identifying a first beamforming technique to utilize for the first device; and based on the second device-type identifier, identifying a second beamforming technique to utilize for the second device, wherein the second beamforming technique is different from the first beamforming technique.

Another aspect of the present disclosure is directed to a method for adaptive beamforming. The system comprises one or more processors and one or more computer-readable media storing computer-usable instructions that, when executed by the one or more processors, cause the one or more processors to: receive a first device-type identifier for a first device, wherein the first device-type identifier indicates the first device is a mobile device; based on the first device-type identifier, selecting a first beamforming technique to broadcast to the first device; identify that the first device has remained on a first beam for a predetermined period of time; determine that the first device is stationary based on its presence on the first beam greater than the predetermined period of time; and dynamically adjust a set of beamforming techniques offered to the first device to include both the first beamforming technique and a second beamforming technique.

As mentioned, the present disclosure describes adaptive beamforming including the selection of and switching between various beamforming techniques. Several beamforming techniques exist. For example, in near cell RF conditions, several beamforming techniques exist based on channel state information (CSI) feedback. The CSI feedback can include channel quality indicators (CQI). There are currently three main methods of beamforming: minimum mean squared error (MMSE), zero forcing (ZF), and Eigen Based Beamforming (EBB). Each method has different CSI requirements. For instance, MMSE can work in imperfect CSI conditions (e.g., such as when UEs are mobile/moving) while EBB can be used with perfect CSI conditions (e.g., when UEs are stationary, such as fixed wireless access (FWA) devices). Using the same method for both types of devices (e.g., stationary and mobile) is not optimal yet that is what is implemented today. In other words, a mobile phone and a FWA device are treated the same today and offered the same beamforming methods despite the different device types acting differently and reporting different CSI feedback. Today, all near cell devices receive the same beamforming method and all cell edge devices receive the same beamforming method, despite the fact that mobile/moving near cell devices have much different requirements that stationary near cell devices. Thus, there is a need to distinguish between the two devices and provide appropriate beamforms to each.

The present solution seeks to utilize CSI feedback quality to select an appropriate beamforming technique. Specifically, when devices are identified as being stationary, the EBB technique can be selected. When a device is identified as being mobile, the MMSE technique can be selected. A device can be identified as mobile when movement above a predetermined threshold is detected (e.g., movement above a predetermined speed such as, for example, 5 km/hr). CSI feedback may also include channel variants that are caused by movement, such that an inference can be made as to whether or not the device is stationary.

A device can also be identified as mobile or stationary based on a device-type identifier. A device-type identifier can include various information about the device such as a make and model number, software version, or other device-specific information that would identify it as a FWA device or mobile device. This information is routinely received by the gNodeB upon attachment to the network such that the information is readily accessible for adaptive beamforming. In aspects, this information is received by the gNodeB upon attachment via an APN or network slicing information. Network slice information can include Single Network Slice Selection Assistance Information (S-NSSAI) including a Slice/Service type (SST) field and a Service Differentiator (SD) field. This information can identify a specific slide on which the UE attaches and can indicate a type of device. For example, a UE may attach to Slice 1 while a FWA device may attach to a different network slice.

Additionally, the network can determine if a device is stationary or mobile based on its attachment to a specific beam for a predetermined period of time. In aspects, the gNodeB transmits beams (e.g., 12 beams) to UEs and a UE attaches to the beam that is best for that particular UE. When a UE selects a single beam (e.g., beam 1) and stays attached to that beam for a period of time greater than a predetermined period of time (e.g., 5 minutes), it can be determined that the device is stationary. That said, stationary does not equal a FWA device. A mobile device that is capable of movement can still be determined to be stationary at specific points in time (e.g., no motion/speed is associated with the device above a predetermined speed threshold, the device has been attached to a specific beam for a predetermined period of time, and the like).

Once a determination is made regarding stationary versus mobile, the network can intelligently select or adjust the beamforming methods offered to devices. As noted above, stationary devices may be offered a first set of beamforming methods including EBB while mobile devices may be offered a second set of beamforming methods including MMSE. Furthermore, upon detection of a change in status (e.g., a device goes from stationary (sitting at home) to mobile (driving to a soccer game)), the network can intelligently switch the beamforming methods offered to the device. In embodiments, the beamforming method that is no longer needed is removed from the available sets of beamforming methods. In other embodiments, the beamforming method that is no longer needed is still offered to the device in addition to the updated beamforming method determined to be needed based on the change in status.

Turning now to FIG. 1, an existing network environment providing beamforms regardless of device-type is depicted. Such a network environment is illustrated and designated generally as network environment 100. As is shown, the network (shown as tower/gNodeB 102) receives CSI feedback 110 from various devices, such as mobile devices 106*a* and 106*b* and FWA devices 108*a* and 108*b*. As is shown, a single beamforming method/technique 104 is provided to each of the devices, despite the fact that each device is a different device-type (e.g., mobile versus fixed).

Figure 2:
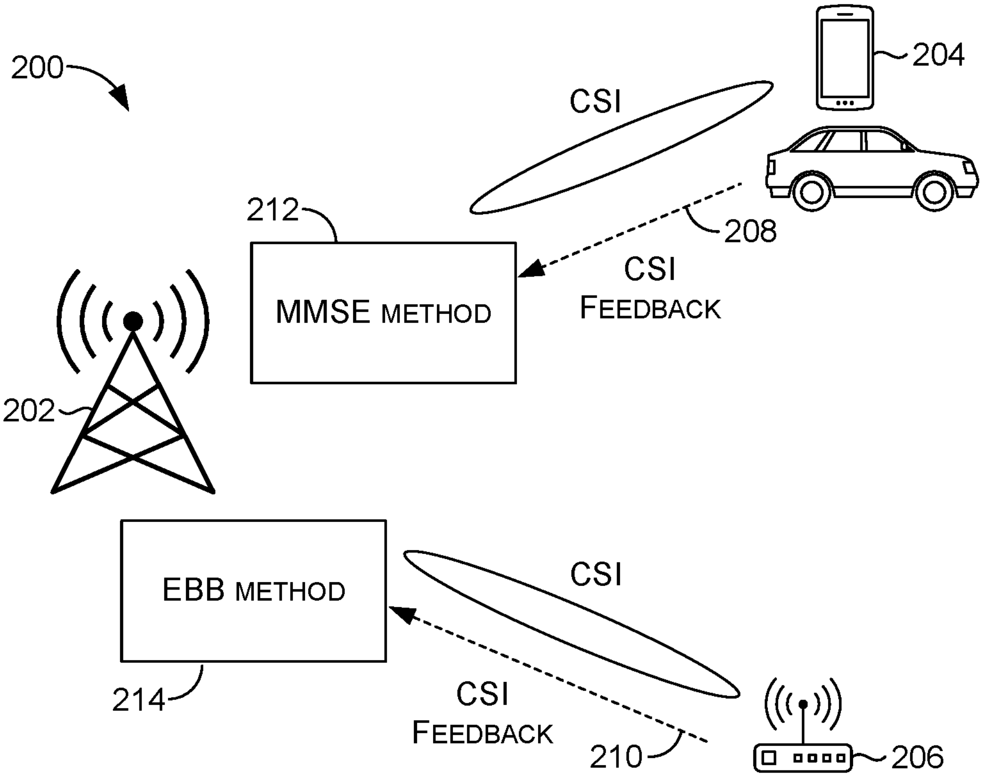
FIG. 2 depicts a diagram of an exemplary network environment in which implementations of the present disclosure may be employed, in accordance with aspects herein.

Turning now to FIG. 2, a network environment for adaptive beamforming is provided. Such a network environment is illustrated and designated generally as network environment 200. Network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

Figure 5:
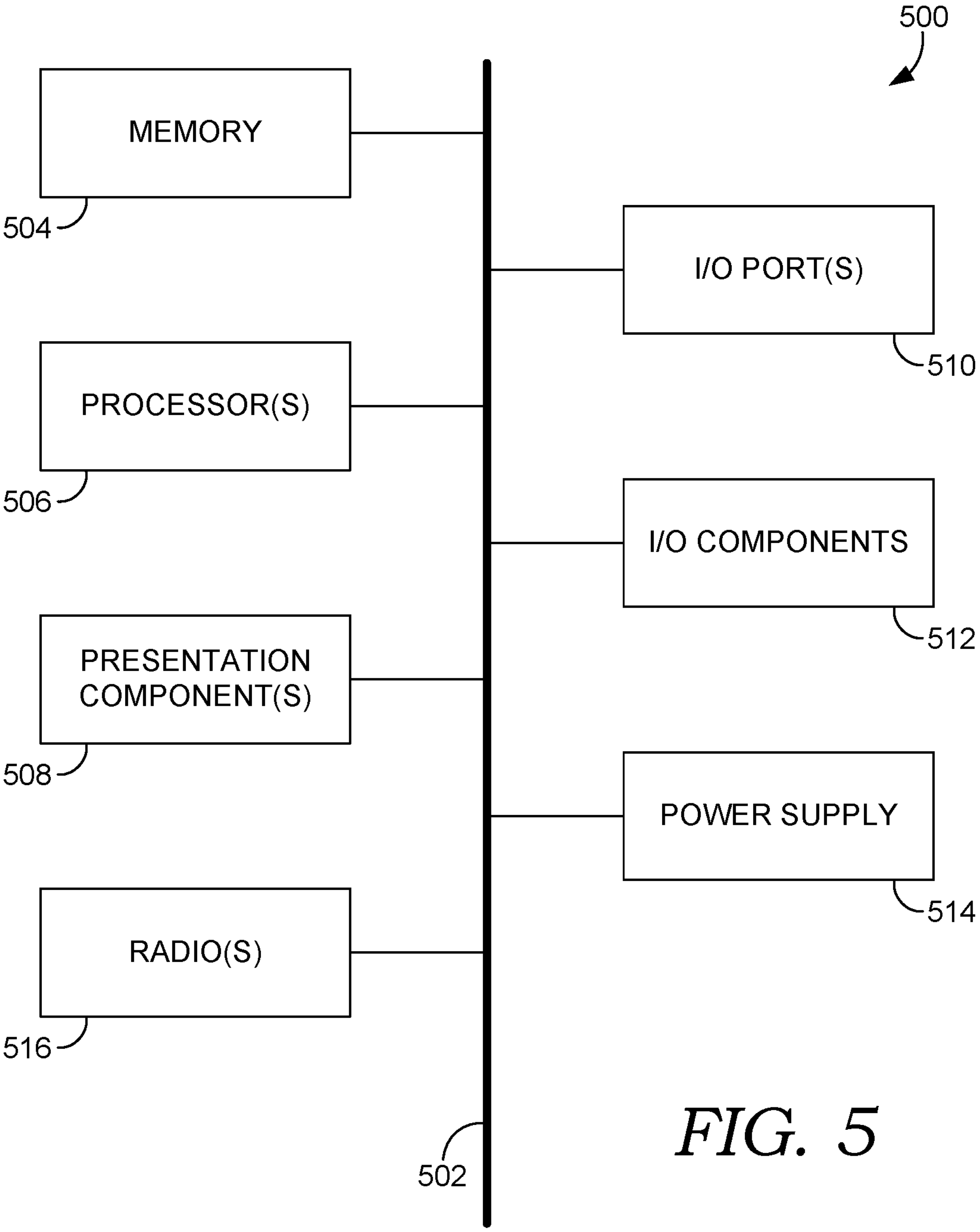
FIG. 5 depicts a diagram of an exemplary computing environment suitable for use in implementations of the present disclosure, in accordance with aspects herein.

A network cell may comprise a base station to facilitate wireless communication between a communications device within the network cell, such as communications device 500 described with respect to FIG. 5, and a network. The UEs (e.g., UE 204 and UE 206) may take on a variety of forms, such as a personal computer, a laptop computer, a tablet, a netbook, a mobile phone, a Smart phone, a FWA device, a personal digital assistant, or any other device capable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 204 and UE 206 comprises a wireless or mobile device with which a wireless telecommunication network(s) can be utilized for communication (e.g., voice and/or data communication). In this regard, the UE can be any mobile computing device that communicates by way of, for example, a 5G network.

The UEs may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, the network is associated with a telecommunications provider that provides services to user devices, such as UE 204 and UE 206. For example, the network may provide voice services to user devices or corresponding users that are registered or subscribed to utilize the services provided by a telecommunications provider.

As shown in FIG. 2, the gNodeB 202 receives CSI feedback 208 from device 204 and CSI feedback 210 from device 206. Device 204 is meant to depict a mobile phone device that is moving in a car and is, thus, not stationary. Device 206 is meant to depict a FWA device and is, thus, stationary. The tower 202 can identify the type of device based on the device-type identifier associated with each device connected to the network. Alternatively, the tower 202 can determine that the device is moving vs. stationary in any number of ways described above such as using a predetermined speed threshold, identifying a pattern of attachment to a specific beam for a predetermined period of time, and the like. Once the tower 202 has determined whether the device is moving or stationary, a beamforming technique may be selected. As previously mentioned, the MMSE technique can be used for mobile devices while the EBB technique can be used for stationary devices. This is not meant to limit the scope of the invention in any way as any other appropriate beamforming method can be used. In general terms, a first beamforming method can be used for mobile devices while a second beamforming method can be used for stationary devices, where the first and second beamforming method are different from one another. In accordance with this approach, FIG. 2 illustrates that the EBB method 214 is utilized for the stationary device 206 while the MMSE method 212 is used for the mobile device 204.

While not specifically illustrated in FIG. 2, device 204 and device 206 could be located in similar locations (i.e., within a predetermined distance from one another). Specifically, embodiments herein allow for multiple different beamforming methods to be transmitted/cast from a single tower to a single site region, such as near cell or cell edge. Thus, device 204 and device 206 are both receiving different beamforming methods while both being located in a near cell environment relative to tower 202.

In addition to utilizing movement to select and switch beamforming methods, the present disclosure can switch beamforming methods based on CSI feedback alone. For instance, if CSI feedback were perfect (e.g., all channel properties of a communication link are known) such that the EBB method were employed but a change in the CSI feedback occurs such that there is degradation in the CQI, the network can intelligently switch between beamforming methods to offer a method that performs well in less than perfect conditions, given the change in the CQI. Thus, a change in motion can be utilized to switch beamforming methods, but is not required. The change in methods can also occur based on a change in CSI feedback indicating degradation in the network conditions (e.g., CQI).

Figure 3:
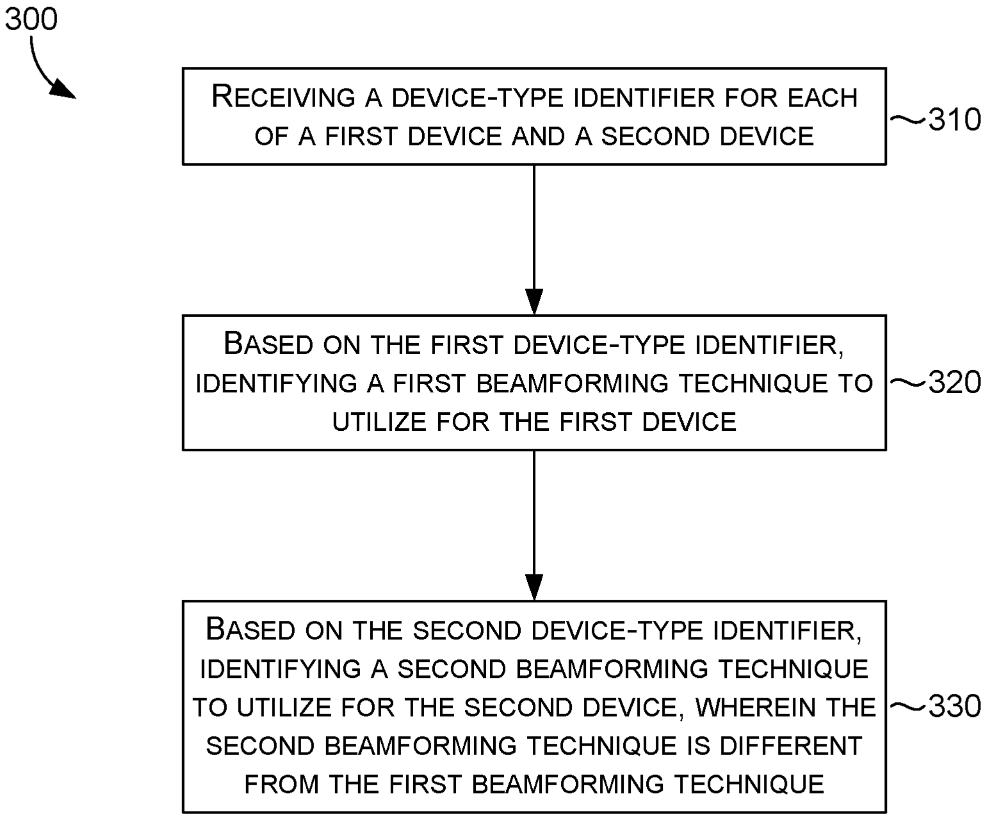
FIG. 3 depicts a flow diagram of a method for adaptive beamforming, in accordance with aspects herein.

Turning to FIG. 3, a flow diagram 300 is provided illustrating a flow to provide adaptive beamforming. Initially, at block 310, a device-type identifier is received for each of a first device and a second device. In aspects, a first device-type identifier for the first device is different from a second device-type identifier for the second device. For instance, the first device-type identifier can be a mobile device while the second device-type identifier can be a FWA device, and vice versa. At block 320, a first beamforming technique is identified to utilize for the first device based on the first device-type identifier. At block 330, a second beamforming technique is identified to utilize for the second device based on the second device-type identifier. In aspects, the second beamforming technique is different from the first beamforming technique.

Figure 4:
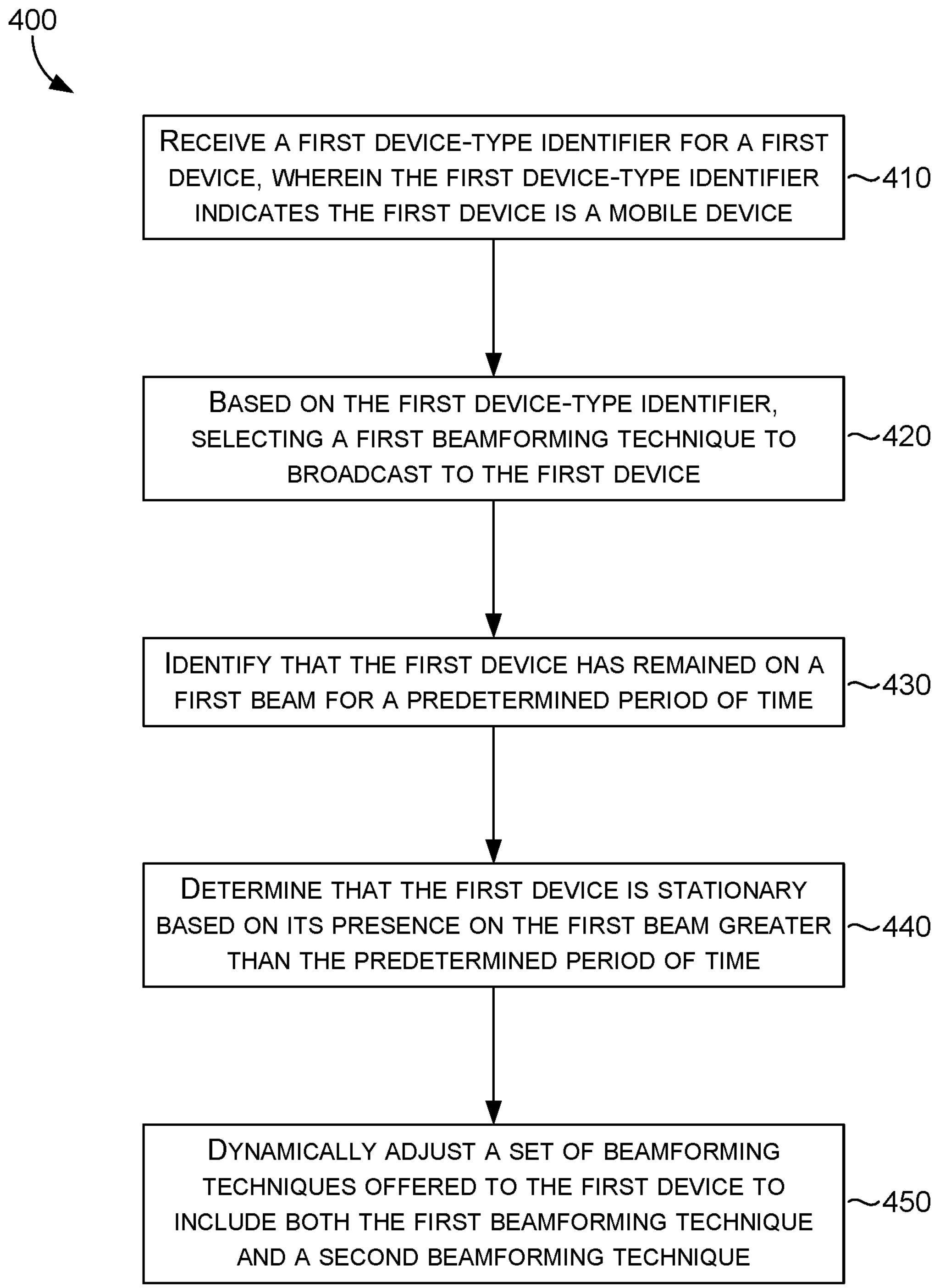
FIG. 4 depicts a flow diagram of a method for adaptive beamforming, in accordance with aspects herein.

Referring to FIG. 4, a flow diagram 400 is provided illustrating a flow to provide adaptive beamforming. Initially, at block 410, a first device-type identifier for a first device is received, wherein the first device-type identifier indicates the first device is a mobile device. At block 420, a first beamforming technique is selected to broadcast to the first device based on the first device-type identifier. At block 430, it is identified that the first device has remained on a first beam for a predetermined period of time. At block 440, it is determined that the first device is stationary based on its presence on the first beam greater than the predetermined period of time. At block 450, a set of beamforming techniques offered to the first device is dynamically adjusted to include both the first beamforming technique and a second beamforming technique.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for adaptive beamforming, the system comprising:
- one or more processors; and
- one or more computer-readable media storing computer-usable instructions that, when executed by the one or more processors, cause the one or more processors to:
- receive a device-type identifier for each of a first device and a second device, wherein a first device-type identifier identifies the first device as a mobile device and a second device-type identifier identifies the second device as a fixed wireless access device;
- based on the first device-type identifier, identify a first beamforming technique to utilize for the first device; and
- based on the second device-type identifier, identify a second beamforming technique to utilize for the second device, wherein the second beamforming technique is different from the first beamforming technique.

2. The system of claim 1, wherein the first beamforming technique is a minimum mean squared error (MMSE).

3. The system of claim 1, wherein the second beamforming technique is Eigen Based Beamforming (EBB).

4. The system of claim 1, wherein the one or more processors is further configured to receive one or more channel state information (CSI) indicators from each of the first device and the second device.

5. The system of claim 4, wherein the CSI indicators comprise channel quality indicators (CQI).

6. The system of claim 5, wherein the one or more processors is further configured to adjust beamforming based on the CQI.

7. A method for adaptive beamforming, the method comprising:
- receiving a device-type identifier for each of a first device and a second device, wherein a first device-type identifier identifies the first device is a mobile device and a second device-type identifier identifies the second device is a fixed wireless access device;
- based on the first device-type identifier, identifying a first beamforming technique to utilize for the first device; and
- based on the second device-type identifier, identifying a second beamforming technique to utilize for the second device, wherein the second beamforming technique is different from the first beamforming technique.

8. The method of claim 7, wherein the first beamforming technique is a minimum mean squared error (MMSE).

9. The method of claim 7, wherein the second beamforming technique is Eigen Based Beamforming (EBB).

10. The method of claim 7, wherein the one or more processors is further configured to receive one or more channel state information (CSI) indicators from each of the first device and the second device.

11. The method of claim 10, wherein the CSI indicators comprise channel quality indicators (CQI).

12. The method of claim 11, wherein the one or more processors is further configured to switch beamforming methods based on the CQI.

13. A system for adaptive beamforming, the system comprising:
- one or more processors; and
- one or more computer-readable media storing computer-usable instructions that, when executed by the one or more processors, cause the one or more processors to:
- receive a first device-type identifier for a first device, wherein the first device-type identifier indicates the first device is a mobile device;
- based on the first device-type identifier, selecting a first beamforming technique to broadcast to the first device;
- identify that the first device has remained on a first beam for a predetermined period of time;
- determine that the first device is stationary based on its presence on the first beam greater than the predetermined period of time; and
- dynamically adjust a set of beamforming techniques offered to the first device to include both the first beamforming technique and a second beamforming technique.

14. The method of claim 13, wherein the first beamforming technique is a minimum mean squared error (MMSE).

15. The method of claim 13, wherein the second beamforming technique is Eigen Based Beamforming (EBB).

16. The method of claim 13, wherein the one or more processors is further configured to:
- detect a change in beam selection by the first device;

upon detecting the change in beam selection by the first device, eliminate the second beamforming technique from the set of beamforming techniques offered to the first device.

17. The method of claim 13, wherein the one or more processors is further configured to:

provide the first beamforming technique to the first device in a near cell environment and provide the second beamforming technique to a second device also located in the near cell environment, wherein the first beamforming technique is different from the second beamforming technique.

18. The method of claim 13, wherein the one or more processors is further configured to remove the first beamforming technique from the set of beamforming techniques offered to the first device.

* * * * *